Sept. 29, 1931.  H. S. DECK  1,825,223
CUTTING MACHINE
Filed May 3, 1929   2 Sheets-Sheet 2
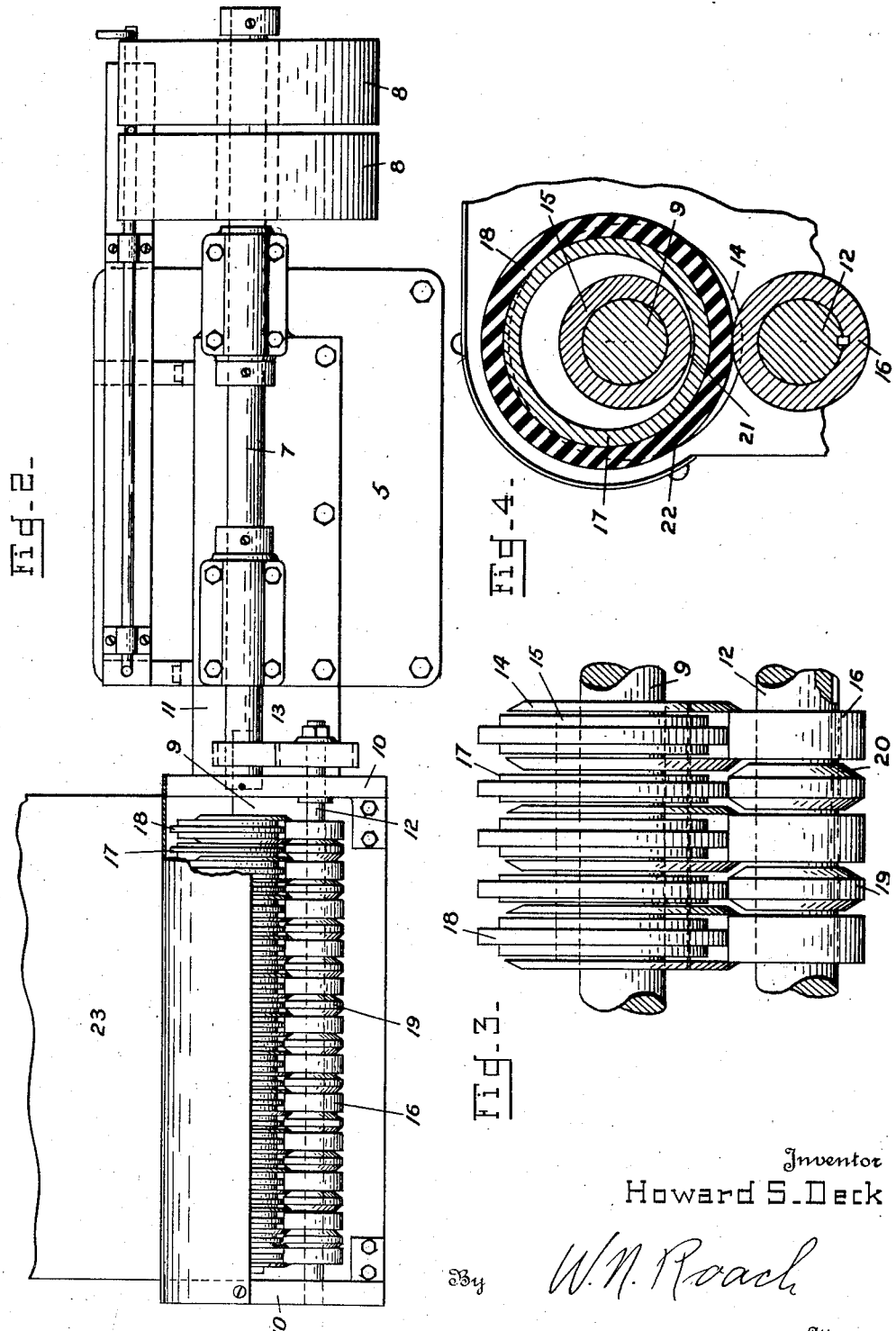
Inventor
Howard S. Deck
By W. N. Roach
Attorney Patented Sept. 29, 1931

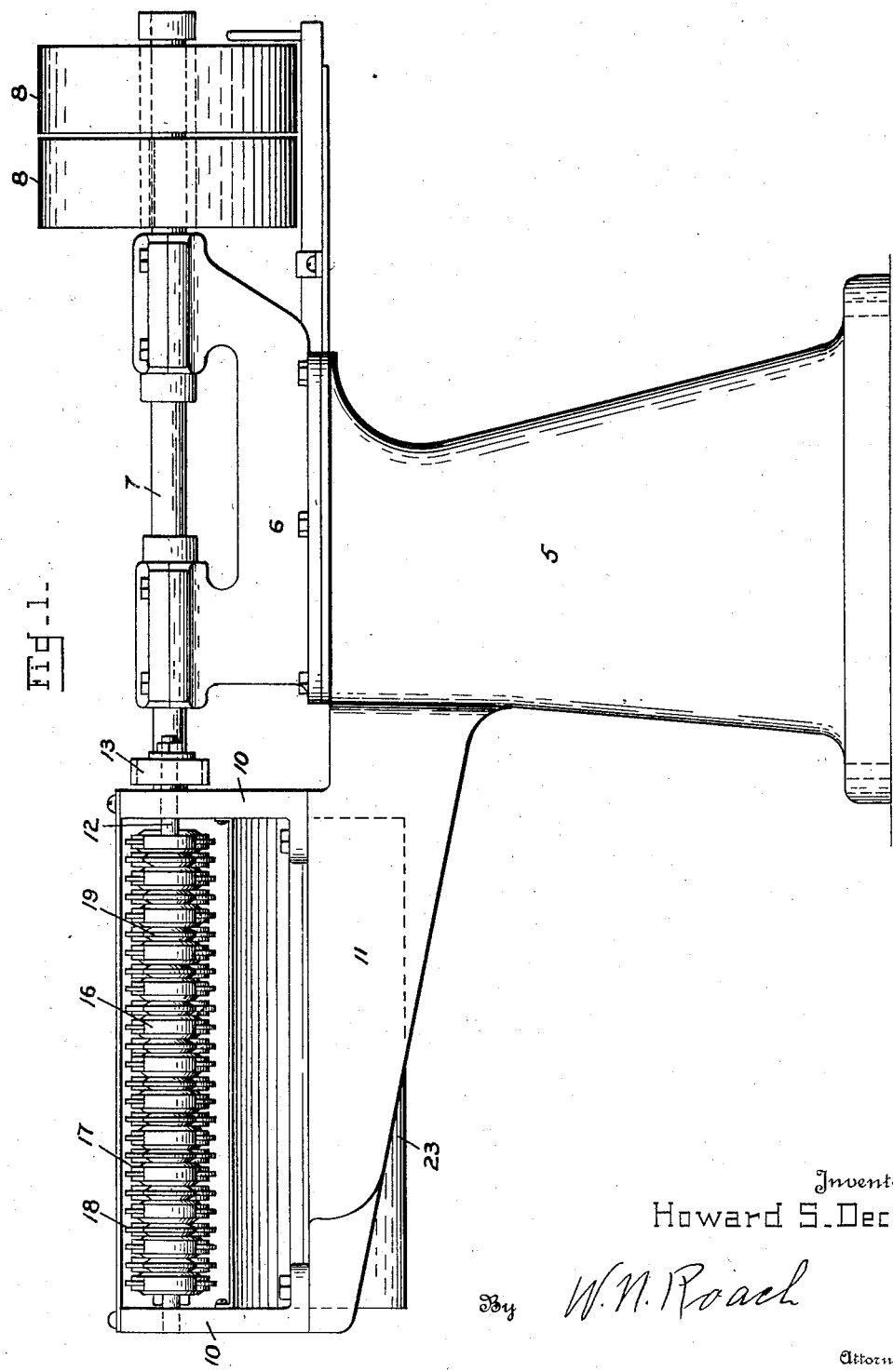

1,825,223

UNITED STATES PATENT OFFICE

HOWARD S. DECK, OF DOVER, NEW JERSEY

CUTTING MACHINE

Application filed May 3, 1929. Serial No. 360,250.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to me of any royalty thereon.

This invention relates to improvements in cutting machines.

In cutting sheets of certain materials, such as smokeless powder, into narrow strips, there is a tendency on the part of the strip to adhere to and follow the cutters.

The principal object of this invention is to arrange a novel feed mechanism in such a manner that it will eject the strips from the cutters and keep the cutters clear of material.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view in side elevation of the improved cutting machine;

Fig. 2 is a plan view thereof;

Fig. 3 is an enlarged plan view of a portion of the cutting and feeding elements; and Fig. 4 is a detailed sectional view on the line 4—4 of Fig. 3.

Referring to the drawings by numerals of reference:

The machine comprises a support 5 on which is mounted a bearing block 6 for a shaft 7 carrying pulleys 8—8 at one end whereby it is connected to a source of power not shown. The other end of the shaft 7 is connected to a collinear shaft 9 mounted in bearing plates 10 secured to an arm 11 of the support 5. A parallel shaft 12 also mounted in the plates 10 is driven from shaft 9 through gearing 13.

Fixed on the drive shaft 9 are a plurality of disk cutters 14 spaced by sleeves 15 and reversely arranged for cooperation by pairs with die collars 16 secured to the driven shaft 12. Mounted loosely on the drive shaft between the cutters are feed rollers 17 having a resilient rim 18, preferably of rubber, for engagement with the die collars and with feed collars 19 placed between the die collars. The feed collars 19 are formed with beveled edges 20 to provide clearance for the cutters and the feed rollers cooperating therewith are narrower than the rollers cooperating with the die collars.

Referring to Fig. 4, the feed rollers when engaged with the collars on the driven shaft are positioned eccentrically with respect to the cutters and when driven normally have a slight clearance 21 from the spacing sleeves 15 at the point of its contact with the collars for the purpose of allowing for transverse shifting.

The feed rollers are preferably of greater diameter than the cutters so that the point indicated at 22 at which they extend beyond the cutters will be favorably positioned with regard to the delivery side of the cutting machine. In the event that the material which is being cut into strips adheres to the cutters, the feed rollers coming into operation at the point 22 eject or extract the strip which then falls to the chute 23.

In feeding a sheet of material to the cutters the resilient rim of the feed rollers and the ability of the rollers to shift transversely due to the clearance established at 21 will allow for inequalities in the thickness of the sheet while insuring positive feed and the communication of rotary movement to the rollers from the collars on the driven shaft 11.

While the machine is shown for a vertical travel of material, it may readily be adapted for receiving the material from other positions.

I claim:

1. In a cutting machine, parallel driven shafts, a plurality of disk cutters fixed on one shaft and reversely arranged in pairs, a spacing sleeve between the cutters, a feed roller of greater diameter than the cutters loosely mounted on each spacing sleeve, a resilient rim on the feed roller, alternately placed die and feed collars on the other shaft maintaining the feed rollers eccentrically with respect to the cutters, the die collar cooperating with each pair of cutters.

2. In a cutting machine, parallel driven shafts, a plurality of pairs of cutters fixed on one shaft, feed rollers of greater diameter than the cutters loosely mounted on the shaft between the pair of cutters, alternately placed die and feed collars on the other shaft holding the feed rollers eccentrically with respect to the cutters, each die collar cooperating with a pair of cutters.

3. In a cutting machine, parallel driven shafts, a plurality of pairs of cutters fixed on one shaft, feed rollers loosely mounted on the shaft between the pairs of cutters, alternately placed die and feed collars on the other shaft holding the feed rollers eccentrically with respect to the cutters, each die collar cooperating with a pair of cutters.

4. In a cutting machine, driven shafts, spaced cutters on one shaft, annular feed rollers of greater diameter than the cutters filling the space between the cutters, and alternate die and feed collars fixed on the other shaft holding the feed rollers eccentrically with respect to the cutters.

5. In a cutting machine, driven shafts, spaced cutters on one shaft, alternate die and feed collars on the other shaft, and annular rollers between the cutters held eccentrically to the first shaft by the die and feed collars and adapted to be rolled between the dies, feed collars and shaft during operation of the machine.

HOWARD S. DECK.